United States Patent
Zamora Esquivel et al.

(10) Patent No.: US 11,727,267 B2
(45) Date of Patent: Aug. 15, 2023

(54) ARTIFICIAL NEURAL NETWORK WITH TRAINABLE ACTIVATION FUNCTIONS AND FRACTIONAL DERIVATIVE VALUES

(71) Applicant: Intel Corporation, Santa Clara, CA (US)

(72) Inventors: Julio Cesar Zamora Esquivel, Zapopan (MX); Jose Rodrigo Camacho Perez, Guadalajara (MX); Paulo Lopez Meyer, Zapopan (MX); Hector Cordourier Maruri, Guadalajara (MX); Jesus Cruz Vargas, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 16/556,937

(22) Filed: Aug. 30, 2019

(65) Prior Publication Data
US 2020/0005143 A1    Jan. 2, 2020

(51) Int. Cl.
*G06N 3/08* (2023.01)
*G06N 3/047* (2023.01)

(52) U.S. Cl.
CPC .............. *G06N 3/08* (2013.01); *G06N 3/047* (2023.01)

(58) Field of Classification Search
CPC .............................. G06N 3/08; G06N 3/0472
See application file for complete search history.

(56) References Cited

U.S. PATENT DOCUMENTS

| 5,101,361 | A | * | 3/1992 | Eberhardt | G06N 3/065 |
| | | | | | 708/801 |
| 5,226,092 | A | * | 7/1993 | Chen | G06N 3/063 |
| | | | | | 382/157 |
| 5,428,710 | A | * | 6/1995 | Toomarian | G06N 3/08 |
| | | | | | 706/25 |
| 2018/0189949 | A1 | * | 7/2018 | Lapiere | G06T 11/60 |
| 2021/0056403 | A1 | * | 2/2021 | Sadowski | G06N 3/063 |

FOREIGN PATENT DOCUMENTS

WO    WO-2011130297 A2 * 10/2011 ............. G06F 17/18

OTHER PUBLICATIONS

Dushkoff et al. (Adaptive Activation Functions for Deep Networks, Feb. 2016, pp. 1-5) (Year: 2016).*
Gomolka (Backpropagation algorithm with fractional derivatives, Oct. 2018, pp. 1-10) (Year: 2018).*

(Continued)

*Primary Examiner* — George Giroux
(74) *Attorney, Agent, or Firm* — Jordan IP Law, LLC

(57) ABSTRACT

Systems, apparatuses and methods may provide for technology that adjusts a plurality of weights in a neural network model and adjusts a plurality of activation functions in the neural network model. The technology may also output the neural network model in response to one or more conditions being satisfied by the plurality of weights and the plurality of activation functions. In one example, two or more of the activation functions are different from one another and the activation functions are adjusted on a per neuron basis.

20 Claims, 10 Drawing Sheets

(56) References Cited

OTHER PUBLICATIONS

Ding et al. (Robust Finite-Time Stabilization of Fractional-Order Neural Networks With Discontinuous and Continuous Activation Functions Under Uncertainty, May 2018, pp. 1477-1490) (Year: 2018).*
Li et al. (Finite-time synchronization of fractional-order memristive recurrent neural networks with discontinuous activation functions, Nov. 2018, pp. 284-293) (Year: 2018).*
Ivanov (Fractional activation functions in feed-forward artificial neural networks, Jun. 2018, pp. 1-4) (Year: 2018).*
Magin (Fractional calculus models of complex dynamics in biological tissues, 2010, pp. 1586-1593) (Year: 2010).*
Kaslik et al. (Nonlinear dynamics and chaos in fractional-order neural networks, Aug. 2012, pp. 245-256) (Year: 2012).*
Wang et al. (Stability analysis of fractional-order Hopfield neural networks with time delays, Apr. 2014, pp. 98-109) (Year: 2014).*
Wikipedia, "Activation Function", <en.wikipedia.org/wiki/Activation_function>, retrieved Jul. 9, 2019, 5 pages.
K. He et al., "Delving Deep into Rectifiers: Surpassing Human-Level Performance on ImageNet Classification," IEEE International Conference on Computer Vision, Feb. 18, 2016, pp. 1026-1034.
K. He et al., "Identity Mappings in Deep Residual Networks," European Conference on Computer Vision, Jul. 25, 2016, 15 pages.
G. Klambauer et al., "Self-Normalizing Neural Networks," 31st Conference on Neural Information Processing Systems, Jun. 2017, 10 pages, Long Beach, CA, USA.
A. Krizhevsky, "Learning Multiple Layers of Features from Tiny Images," Apr. 8, 2009, 60 pages, vol. 1: Issue 4; University of Toronto, Toronto, Canada.
A. Sharma, "Understanding Activation Functions in Neural Networks," <medium.com/the-theory-of-everything/understanding-activation-functions-in-neural-networks-9491262884e0>, retrieved Jul. 9, 2019, 6 pages.
Anonymous, "Adaptive Activation Functions Using Fractional Calculus," ICCV, 2019, 8 pages.

* cited by examiner

US 11,727,267 B2

ARTIFICIAL NEURAL NETWORK WITH TRAINABLE ACTIVATION FUNCTIONS AND FRACTIONAL DERIVATIVE VALUES

TECHNICAL FIELD

Embodiments generally relate to artificial neural networks. More particularly, embodiments relate to artificial neural networks with trainable activation functions and fractional derivative values.

BACKGROUND

Artificial neural networks may facilitate decision-making in autonomous vehicles, natural language processing applications, and so forth. A typical artificial neural network (ANN) includes one or more layers of neurons, where each neuron calculates a weighted sum of the inputs to the neuron, adds a bias, and then decides whether the neuron should be "fired" (e.g., activated). In conventional solutions, all neurons in an artificial neural network are limited to the same activation function, which is manually selected based on heuristics and the personal experience of the network developer. Such an approach may increase time to market (TTM), as well as result in suboptimal performance and/or a larger memory footprint.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
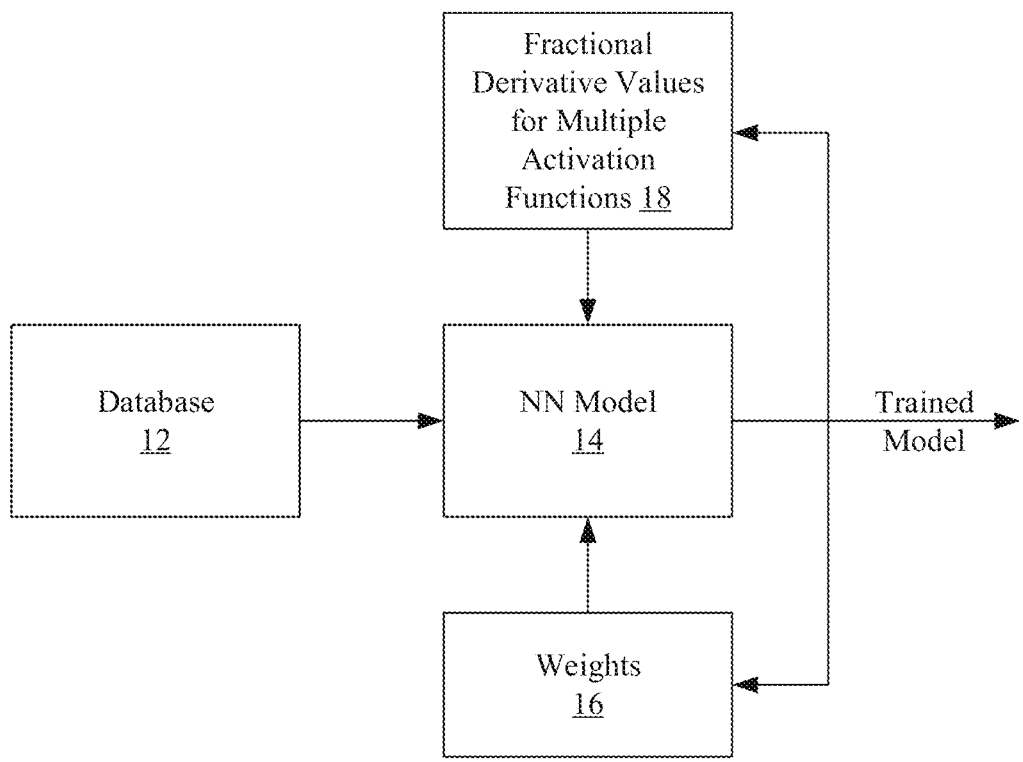
FIG. 1 is a block diagram of an example of a training architecture according to an embodiment.

Turning now to FIG. 1, a training architecture 10 is shown in which a neural network (NN) model 14 receives training data (e.g., images, audio recordings, etc.) from a database 12, where the NN model 14 may generally be used to facilitate decision-making in autonomous vehicles, natural language processing applications, and so forth. In an embodiment, the NN model 14 includes one or more layers of neurons, where each neuron calculates a weighted sum of the inputs to the neuron, adds a bias, and then decides the extent to which the neuron should be fired/activated in accordance with an activation function that is dedicated and/or specific to the neuron. Providing the neurons with different activation functions decreases TTM, enhances performance and/or reduces the memory footprint of the NN model 14. For example, automatically adjusting the activation functions eliminates manual selection procedures (e.g., based on heuristics and/or the personal experience of the network developer) that involve time-consuming experimentation. Moreover, adjusting the activation functions on a per neuron basis enables each neuron to make more accurate firing decisions. Additionally, the enhanced performance may translate into a smaller memory footprint due to more efficient data collection and/or storage.

In the illustrated example, a plurality of weights 16 and fractional derivative values 18 for multiple activation functions are iteratively input to the NN model 14. In general, error functions are calculated during forward propagation of the data from the database 12 through the NN model 14, with the weights 16 and fractional derivative values 18 being adjusted during backpropagation to reduce error. Once the NN model 14 achieves (e.g., converges on) a target level of accuracy (e.g., acceptable level of error), the NN model 14 may be output as a trained model that is used to draw real-time inferences (e.g., automotive navigation inferences, speech recognition inferences, etc.).

Figure 2A:
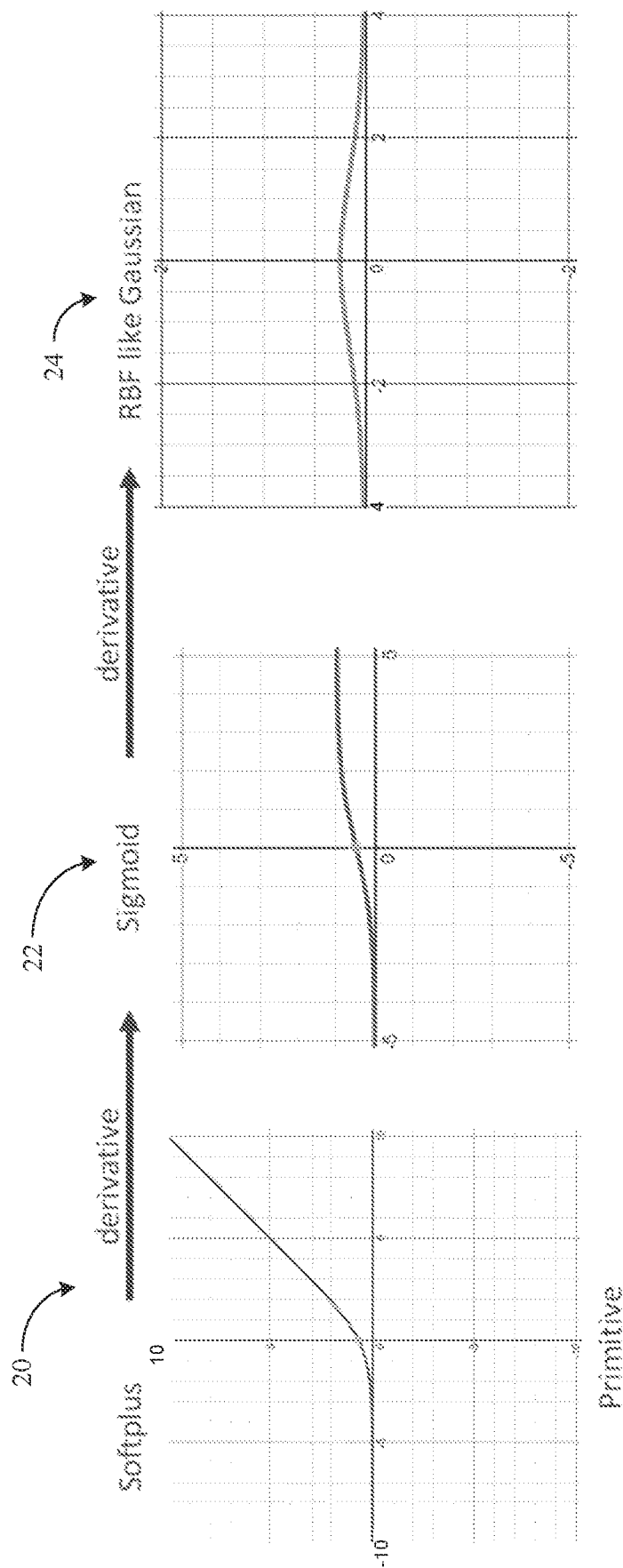
FIG. 2A is a set of plots of an example of a group of activation functions containing a softplus activation function according to an embodiment.

FIG. 2A demonstrates that activation functions may be organized into groups based on the derivative behavior of the activation functions. In the illustrated example, the first derivative of a softplus function 20 is a sigmoid function 22 and the second derivative of the softplus function 20 is a radial basis function (RBF) 24 that is similar to a Gaussian function. A generalized expression of the softplus function 20 is provided in the below expression:

$$g(x) = D^a \ln(1+e^x) \qquad (1)$$

where D is the derivative and a is a trainable parameter that sets the fractional value. Thus, activation functions are trainable generalized activation functions using fractional calculus theory.

With regard to fractional calculus, the below expression of the first, second, and third derivative, $$y' = \frac{dy}{dx}, \; y'' = \frac{d^2y}{dx^2}, \; y''' = \frac{d^3y}{dx^3} \qquad (2)$$

provides the basis to generate the fractional derivative $D^a$ (e.g., the 1.5 derivative) of an activation function.

Figure 2B:
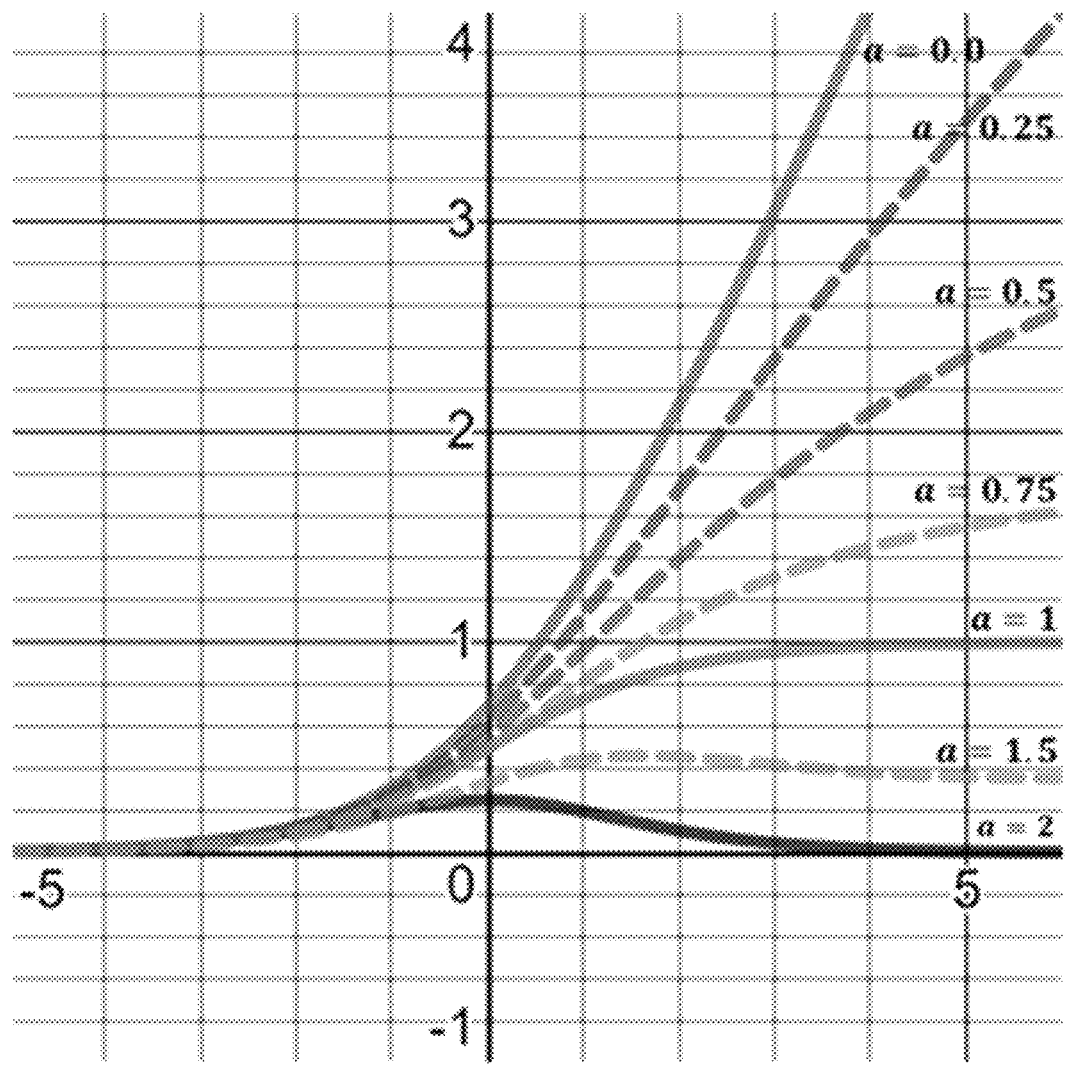
FIG. 2B is a plot of an example of fractional derivative values for a softplus activation function according to an embodiment.

FIG. 2B demonstrates in a plot 28 that controlling the fractional derivative value a determines the behavior of the generalized activation functions so that the generalized activation functions take the form f=g(x,a). For instance, for the softplus function 20 (FIG. 2A), the generalized definition is:

$$g(x) = \lim_{h \to 0} \frac{1}{h^a} \sum_{n=0}^{\infty} (-1)^n \frac{\Gamma(a+1)\ln(1+e^{(x-nh)})}{\Gamma(n+1)\Gamma(1-n+a)} \qquad (3)$$

where the gamma function (F(z)) is defined as:

$$\Gamma(z) = \int_0^\infty t^{(z-1)} e^{-t} dt \qquad (4)$$

In the illustrated example, as a is varied from zero to one, the activation function "morphs" from a softplus function to a sigmoid function. Similarly, as a is varied from one to two, the activation function morphs from the sigmoid function to an RBF like Gaussian function.

Figure 3A:
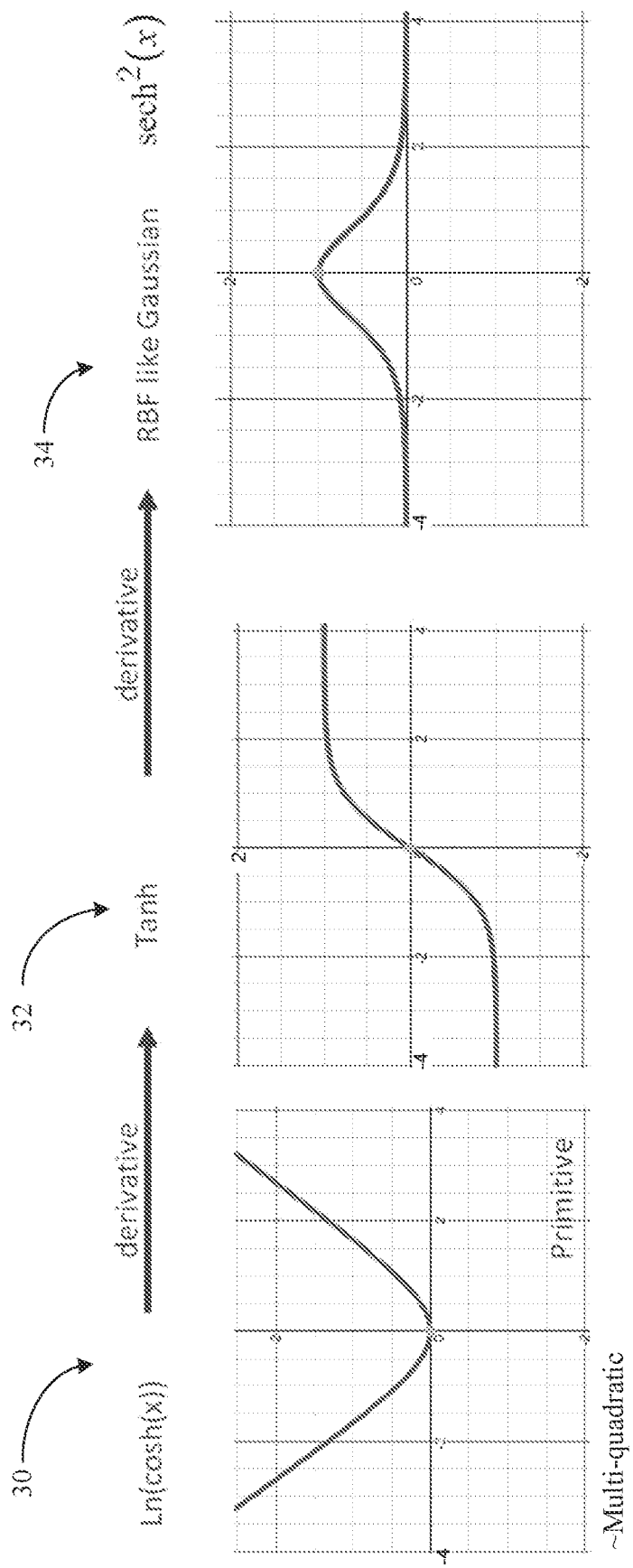
FIG. 3A is a set of plots of an example of a group of activation functions containing a hyperbolic tangent activation function according to an embodiment.

FIG. 3A demonstrates that the first derivative of a multi-quadratic function 30 is a hyperbolic tangent function 32 and the second derivative of the multi-quadratic function 30 is an RBF 24 that is similar to a Gaussian function. A generalized expression of the hyperbolic tangent function 32 is provided in the below expression:

$$g(x) = D^a \tan h(x) \qquad (5)$$

Figure 3B:
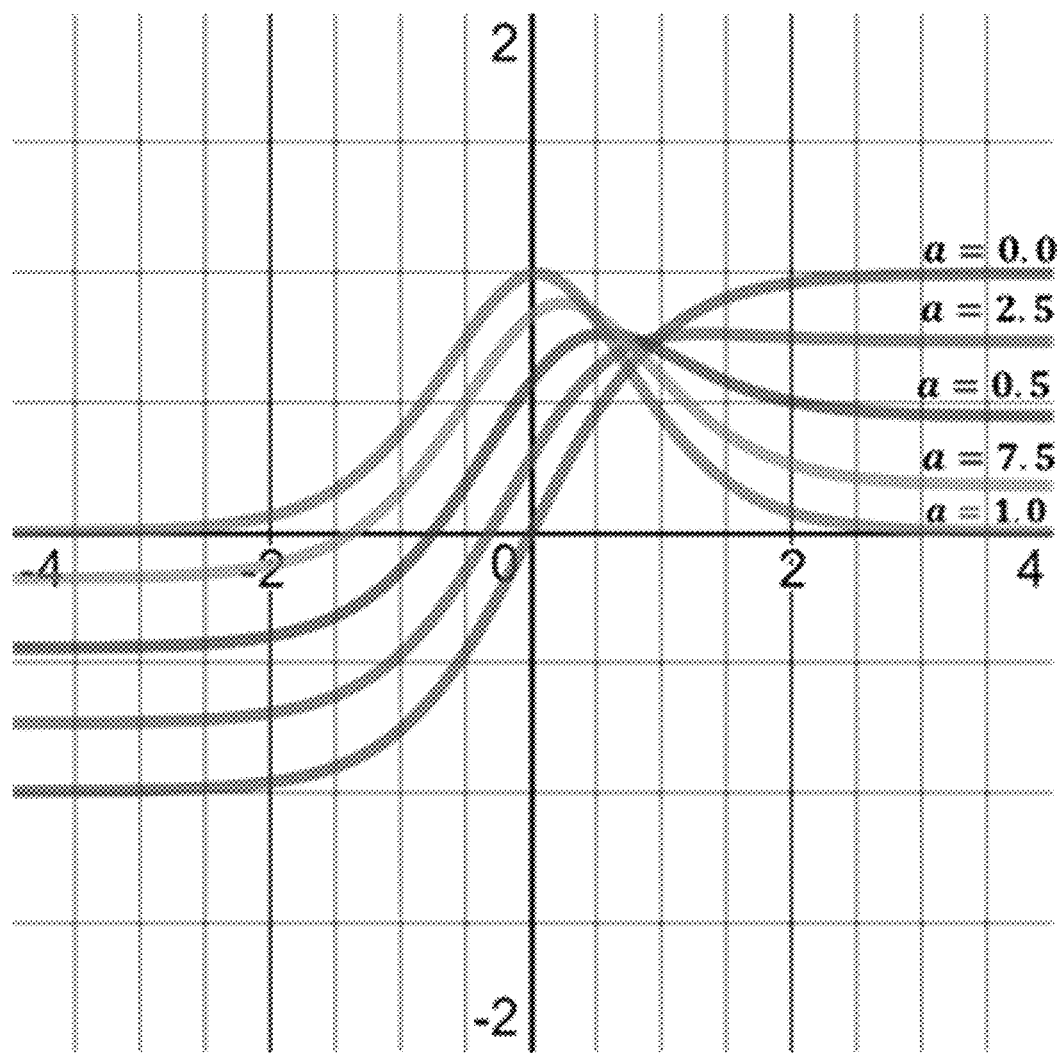
FIG. 3B is a plot of an example of fractional derivative values for a hyperbolic tangent activation function according to an embodiment.

FIG. 3B demonstrates in a plot 36 that controlling the fractional derivative value a determines the behavior of the generalized activation function. For instance, for the hyperbolic tangent function 32 (FIG. 3A), the generalized definition is:

$$g(x) = \lim_{h \to 0} \sum_{n=0}^\infty (-1)^n \frac{\Gamma(a+1)\tanh(x-n \cdot h)}{\Gamma(n+1)\Gamma(1-n+a)}. \qquad (6)$$

where the gamma function is defined as in expression (4). In the illustrated example, as a is varied from zero to one, the activation function morphs from a hyperbolic tangent function to an RBF like Gaussian function.

Figure 4A:
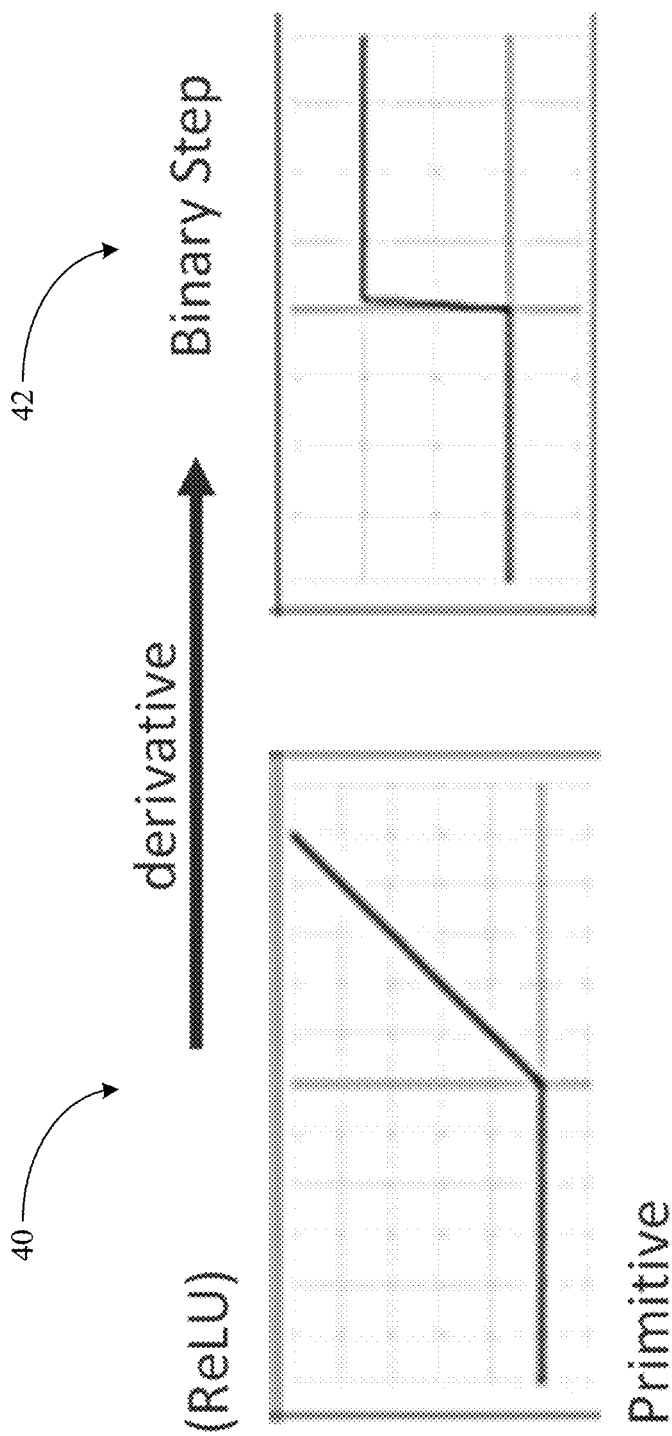
FIG. 4A is a set of plots of an example of a group of activation functions containing a rectified linear unit (ReLU) activation function according to an embodiment.

FIG. 4A demonstrates that the first derivative of an ReLU function 40 is a binary step function 42. A generalized expression of the ReLU function 40 is provided in the below expression.

$$g(x) = \begin{cases} D^a x & x > 0 \\ 0 & x \leq 0 \end{cases} \qquad (7)$$

Figure 4B:
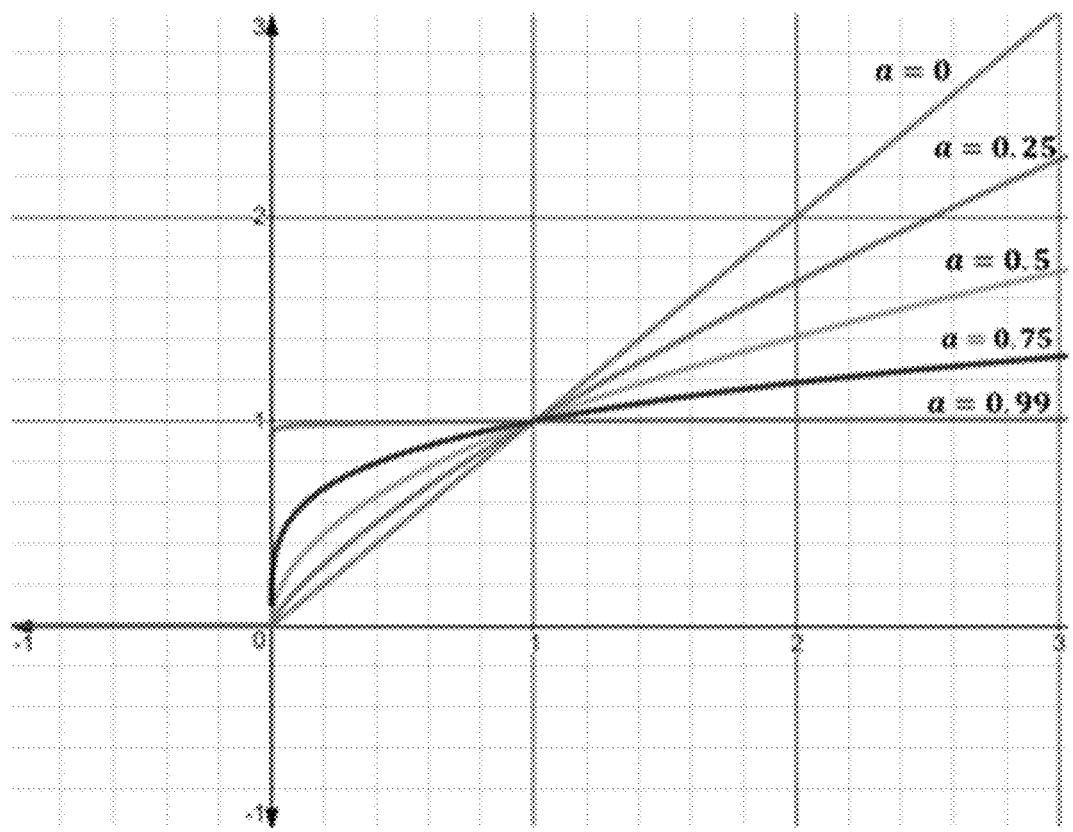
FIG. 4B is a plot of an example of fractional derivative values for an ReLU activation function according to an embodiment.

FIG. 4B demonstrates in a plot 44 that controlling the fractional derivative value a determines the behavior of the generalized activation function. For instance, for the ReLU function 40 (FIG. 4A), the generalized definition is:

$$g(x) = \frac{x^{1-a}}{\Gamma(2-a)}, \qquad (8)$$

where the gamma function is defined as in expression (4). In the illustrated example, as a is varied from zero to one, the activation function morphs from an ReLU function to a step function.

To train these functions using backpropagation, the partial derivative of g(x) with respect to a may be used. For instance, in the case of the softplus function 20 (FIG. 2A), the partial derivative is given by:

$$\frac{\partial}{\partial a} g(x) = \lim_{h \to 0} \sum_{n=0}^\infty (-1)^n \frac{\ln(1 + e^{(x-nh)})}{\Gamma(n+1)} \frac{\partial}{\partial a} A(a) \qquad (9)$$

Where $$\frac{\partial}{\partial a} A(a) = A(a)[\psi(a+1) - \psi(1-n+a) - \ln(h)] \qquad (10)$$

And $$\psi(a+1) - \psi(1-n+a) = \sum_{k=1}^\infty \frac{n}{(k+a)(k+a-n)} \qquad (11)$$

In the development above, a denotes the fractional derivative value that allows the activation functions to morph during training to the most suitable case that will end in a better generalization of the final NN model. Moreover, the activation functions may be organized into a library of trainable activation functions. For example, the library might include data corresponding to plots 28, 36 and 44 (FIGS. 2B, 3B and 4B, respectively), where the activation functions to be used during training are automatically selected from the library.

Figure 5A:
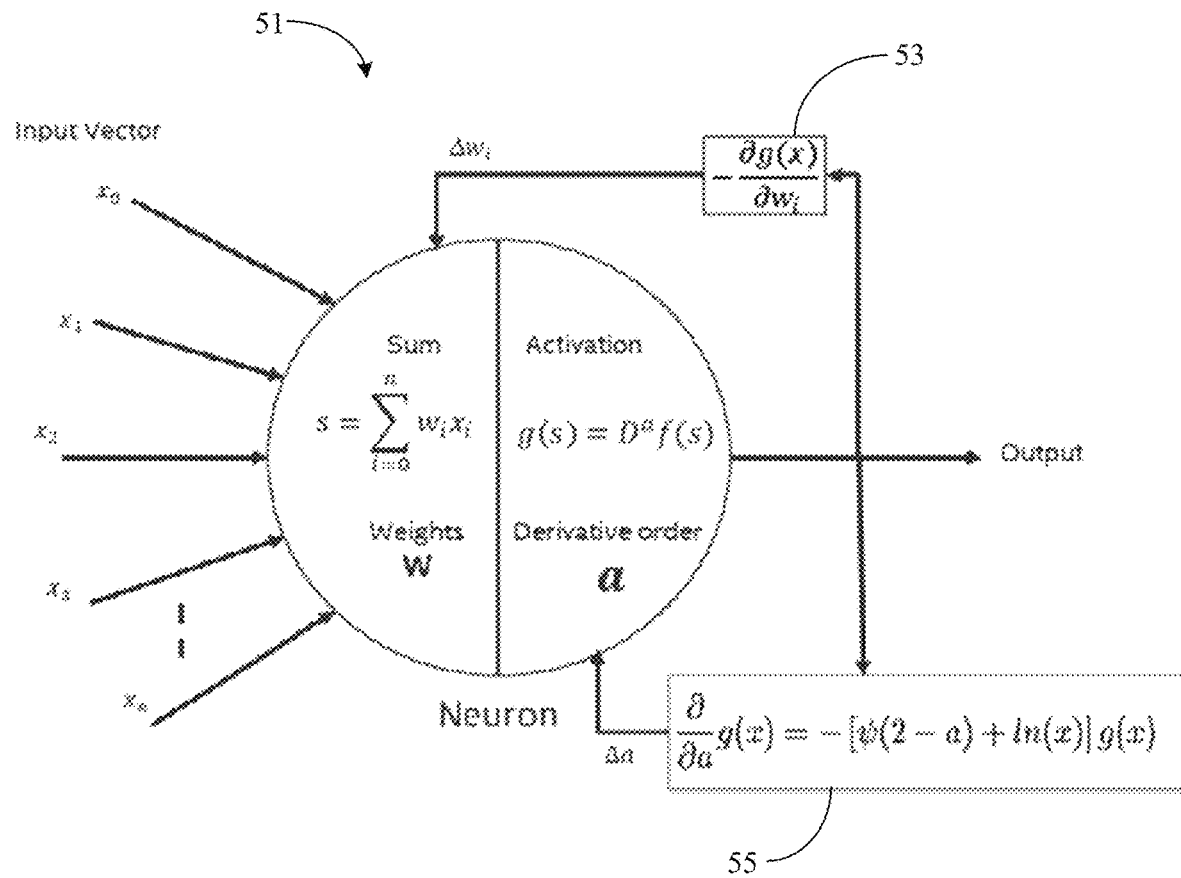
FIG. 5A is an illustration of an example of a neuron having tunable parameters according to an embodiment.

FIG. 5A shows a neuron 51 having an adjustable plurality of weights (W) and an adjustable derivative order (a). In the illustrated example, a weight adjuster 53 determines the gradient $$-\frac{\partial g(x)}{\partial w_i}$$

based on the output of the neuron 51 and applies a weight adjustment vector ($\Delta w_i$) to the summation of an input vector ($x_i$). Additionally, a derivative order adjuster 55 determines the partial derivative $$-\frac{\partial}{\partial a} g(x)$$

based on the output of the neuron 51 and applies a difference value ($\Delta a$) to the activation function g(s). Adjusting the activation function as shown enables the behavior of the neuron 51 to be modified independently of the other neurons in the network. The adjustment to the activation function may be applied by modifying register values, control signals, etc., in accordance with the difference value $\Delta a$ as appropriate. For example, if a particular register contains the values of the variables in the activation function g(s), the adjustment might be accomplished by modifying the register entry corresponding to the derivative order a.

Figure 5B:
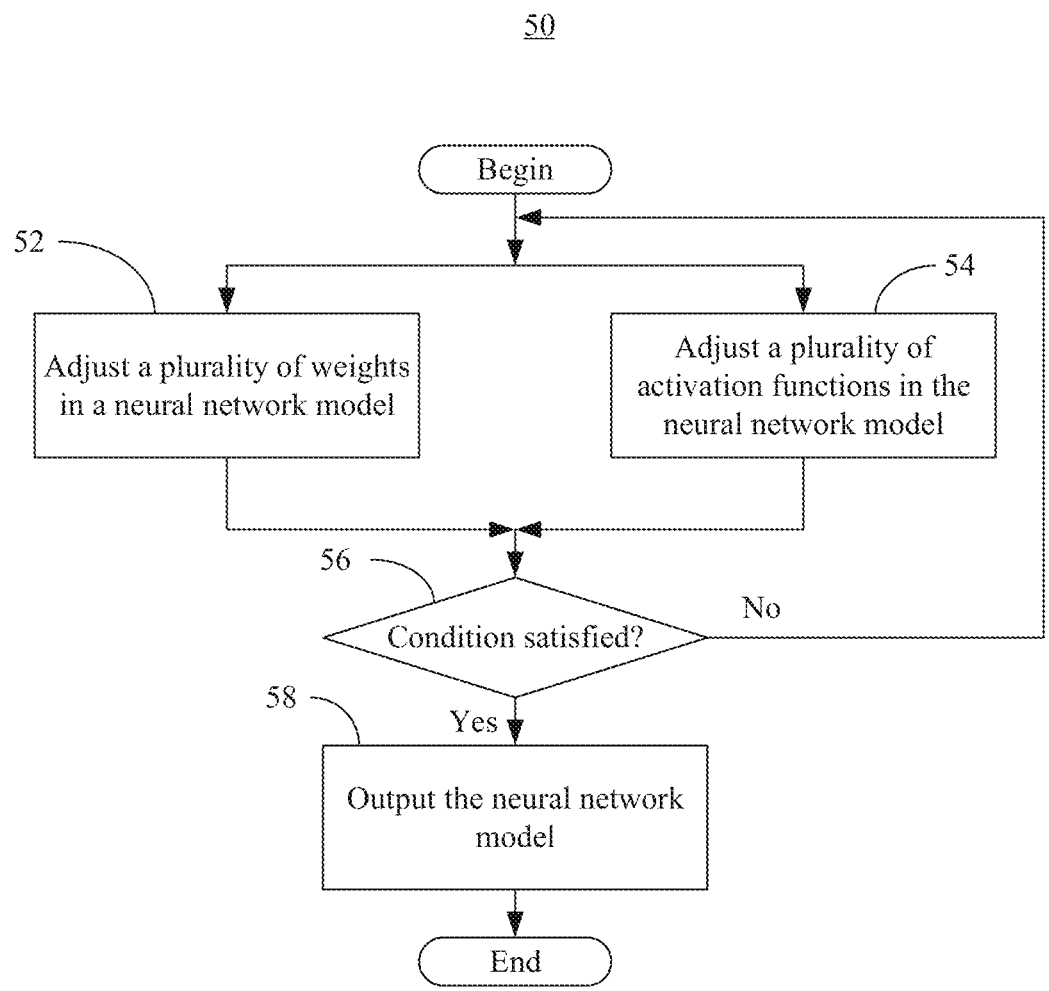
FIG. 5B is a flowchart of an example of a method of training an artificial neural network according to an embodiment.

FIG. 5B shows a method 50 of training an artificial neural network. The method 50 may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 adjusts a plurality of weights in the neural network model, where a plurality of activation functions in the neural network model are adjusted at block 54. Blocks 52 and 54 may be conducted by a backpropagation of the neural network model. In one example, block 52 includes determining the gradient $$-\frac{\partial g(x)}{\partial w_i}$$

based on the output of the neuron 51 and applying a weight adjustment vector ($\Delta w_i$) to the summation of an input vector ($x_i$), as already discussed.

In an embodiment, block 54 includes automatically adjusting the activation functions on a per neuron basis. See, for example, expressions (9) and (10), where, $$A(a) = \frac{\Gamma(a+1)}{h^a \Gamma(1-n+a)} \quad (12)$$

In one example, block 54 includes determining the partial derivative $$-\frac{\partial}{\partial a} g(x)$$

based on the output of each neuron and applying a difference value ($\Delta a$) to the activation function g(s). Thus, a first difference value may be applied to a first activation function of a first neuron, a second difference value may be applied to a second activation function of a second neuron, and so forth. Accordingly, two or more of the activation functions may be different from one another. For example, one neuron in a given layer might use a softplus activation function such as, for example, the softplus function 20, to make firing decisions whereas another neuron in the same layer may use a sigmoid activation function such as, for example, the sigmoid function 22 to make firing decisions. Such an approach enables each neuron to make more accurate firing decisions, which in turn enhances performance.

Additionally, block 54 may involve adjusting fractional derivative values. In an embodiment, adjusting fractional derivative values enables the activation functions to automatically morph during training to more optimal behaviors. Accordingly, the fractional derivative values further enhance performance and facilitate the elimination of manual function selection that would otherwise increase the TTM. As already noted, the enhanced performance may translate into a smaller memory footprint due to more efficient data collection and/or storage.

Block 54 may also including selecting the plurality of activation functions from a library of trainable activation functions. In one example, the library includes data corresponding to plots 28, 36 and 44 (FIGS. 2B, 3B and 4B, respectively), where the activation functions to be used during training are automatically selected from the library. Such an approach further enhances performance via increased flexibility. Illustrated block 56 determines whether the plurality of weights and the plurality of activation functions satisfy a condition such as, for example, an accuracy condition (e.g., the artificial neural network has converged to an acceptable level of error). If not, the method 50 may repeat. Otherwise, block 58 outputs the trained neural network model in response to the weights and the activation functions satisfying the condition and the illustrated method 50 terminates. Accordingly, the illustrated method 50 decreases TTM, enhances performance and/or reduces the memory footprint of the neural network model.

Figure 6:
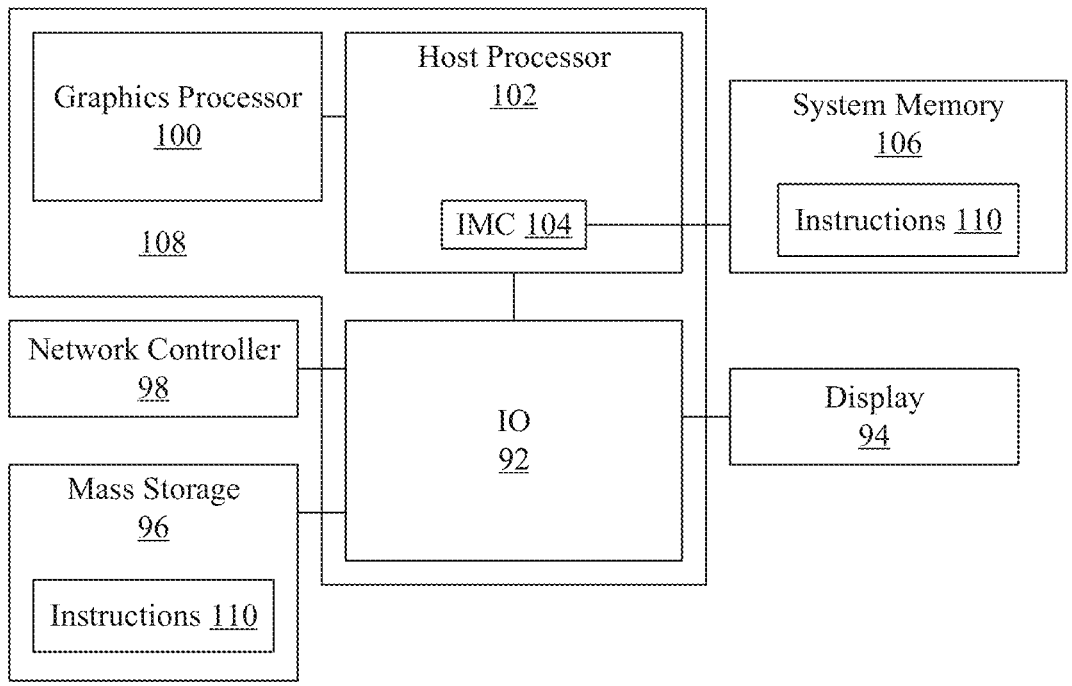
FIG. 6 is a block diagram of an example of a performance-enhanced computing system according to an embodiment.

FIG. 6 shows a performance-enhanced computing system 90. More particularly, the system 90 may be part of a server, desktop computer, notebook computer, tablet computer, convertible tablet, smart television (TV), personal digital assistant (PDA), mobile Internet device (MID), smart phone, wearable device, media player, vehicle, robot, drone, etc., or any combination thereof. In the illustrated example, an input/output (IO) module 92 is communicatively coupled to a display 94 (e.g., liquid crystal display/LCD, light emitting diode/LED display, touch screen), mass storage 96 (e.g., NAND flash memory) and a network controller 98 (e.g., wired, wireless).

The system 90 may also include a graphics processor 100 and a host processor 102 (e.g., central processing unit/CPU) that includes an integrated memory controller (IMC) 104, wherein the illustrated IMC 104 communicates with a system memory 106 over a bus or other suitable communication interface. The host processor 102, the graphics processor 100 and the IO module 92 are integrated onto a shared semiconductor die 108 in a system on chip (SoC) architecture.

In an embodiment, the system memory 106 and/or the mass storage 96 include instructions 110, which when executed by the host processor 102, the IO module 92 and/or the graphics processor 100, cause the computing system 90 to conduct one or more aspects of the method 50 (FIG. 5), already discussed. Thus, execution of the instructions 110 may cause the computing system 90 to adjust a plurality of weights in a neural network model, adjust a plurality of activation functions in the neural network model, and output the neural network model in response to one or more conditions (e.g., accuracy conditions) being satisfied by the weights and the activation functions. In an embodiment, two or more of the plurality of activation functions are different from one another. Moreover, the activation functions may be adjusted on a per neuron basis. In one example, adjusting the activation functions includes adjusting fractional derivative values. Execution of the instructions 110 may also cause the computing system 90 to automatically select the plurality of activation functions from a library of trainable activation functions.

The illustrated computing system 90 is therefore performance-enhanced because multiple (e.g., different) activation functions are deployed in the same neural network model. Moreover, adjusting the activation functions on a per neuron basis enables each neuron to make more accurate firing decisions. Indeed, the enhanced performance may translate into a smaller memory footprint due to more efficient data collection and/or storage. The computing system 90 is further enhanced because automatically adjusting the activation functions eliminates manual selection procedures (e.g., based on heuristics and/or the personal experience of the network developer) that involve time-consuming experimentation.

Figure 7:
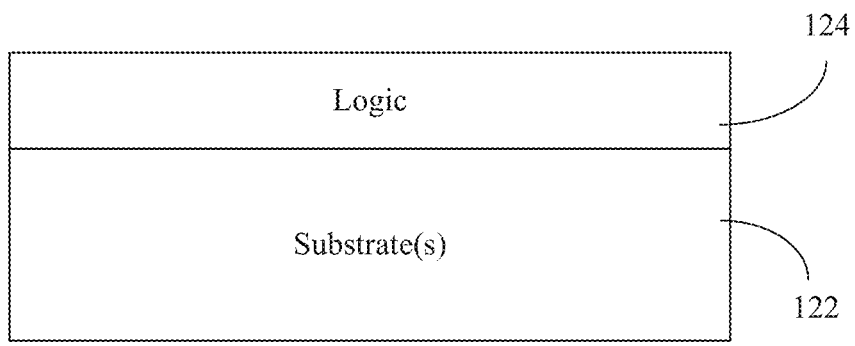
FIG. 7 is an illustration of an example of a semiconductor package apparatus according to an embodiment.

FIG. 7 shows a semiconductor apparatus 120 (e.g., chip, die) that includes one or more substrates 122 (e.g., silicon, sapphire, gallium arsenide) and logic 124 (e.g., transistor array and other integrated circuit/IC components) coupled to the substrate(s) 122. The logic 124, which may be implemented at least partly in configurable logic and/or fixed-functionality hardware logic, may generally implement one or more aspects of the method 50 (FIG. 5), already discussed. Thus, the logic 124 may adjust a plurality of weights in a neural network model, adjust a plurality of activation functions in the neural network model, and output the neural network model in response to one or more conditions (e.g., accuracy conditions) being satisfied by the weights and the activation functions. In an embodiment, two or more of the plurality of activation functions are different from one another. Moreover, the activation functions may be adjusted on a per neuron basis. In one example, adjusting the activation functions includes adjusting fractional derivative values. The logic 124 may also select the plurality of activation functions from a library of trainable activation functions.

The illustrated apparatus 120 is therefore performance-enhanced because multiple (e.g., different) activation functions are deployed in the same neural network model. Moreover, adjusting the activation functions on a per neuron basis enables each neuron to make more accurate firing decisions. Indeed, the enhanced performance may translate into a smaller memory footprint due to more efficient data collection and/or storage. The apparatus 120 is further enhanced because automatically adjusting the activation functions eliminates manual selection procedures (e.g., based on heuristics and/or the personal experience of the network developer) that involve time-consuming experimentation.

Indeed, experimental results indicate that if training is initialized/started with all activation functions being softplus functions, the NN will end with the same selection of activation functions as when initializing training with all activation functions being sigmoid functions. Moreover, independently of initialization, every neuron ends with an activation function that has a better fit. As a result, the total error rate decreases faster, which provides better accuracy. For example, a ResNet18 NN topology was modified to use a trainable activation function, where a training and testing routine was performed using the well-known CIFAR10 image database. It was observed that the enhanced version (e.g., ResNet18*) achieved better results than a conventional solution using a ResNet100 NN.

In one example, the logic 124 includes transistor channel regions that are positioned (e.g., embedded) within the substrate(s) 122. Thus, the interface between the logic 124 and the substrate(s) 122 may not be an abrupt junction. The logic 124 may also be considered to include an epitaxial layer that is grown on an initial wafer of the substrate(s) 122.

ADDITIONAL NOTES AND EXAMPLES

Example 1 includes a performance-enhanced computing system comprising a network controller, a processor coupled to the network controller, and a memory coupled to the processor, the memory including a set of instructions, which when executed by the processor, cause the computing system to adjust a plurality of weights in a neural network model, adjust, via a plurality of difference values on a per neuron basis, a plurality of activation functions in the neural network model, and output the neural network model in response to one or more conditions being satisfied by the plurality of weights and the plurality of activation functions.

Example 2 includes the computing system of Example 1, wherein two or more of the plurality of activation functions are to be different from one another.

Example 3 includes the computing system of Example 1, wherein to adjust the plurality of activation functions on the per neuron basis, the instructions, when executed, cause the computing system to apply a first difference value to a first activation function of a first neuron, and apply a second difference value to a second activation function of a second neuron.

Example 4 includes the computing system of Example 1, wherein to adjust the plurality of activation functions, the instructions, when executed, cause the computing system to adjust fractional derivative values.

Example 5 includes the computing system of Example 1, wherein the instructions, when executed, cause the computing system to select the plurality of activation functions from a library of trainable activation functions.

Example 6 includes the computing system of any one of Examples 1 to 5, wherein the one or more conditions include an accuracy condition.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to adjust a plurality of weights in a neural network model, adjust, via a plurality of difference values on a per neuron basis, a plurality of activation functions in the neural network model, and output the neural network model in response to one or more conditions being satisfied by the plurality of weights and the plurality of activation functions.

Example 8 includes the semiconductor apparatus of Example 7, wherein two or more of the plurality of activation functions are to be different from one another.

Example 9 includes the semiconductor apparatus of Example 7, wherein to adjust the plurality of activation functions on the per neuron basis, the logic coupled to the one or more substrates is to apply a first difference value to a first activation function of a first neuron and apply a second difference value to a second activation function of a second neuron.

Example 10 includes the semiconductor apparatus of Example 7, wherein to adjust the plurality of activation functions, the logic coupled to the one or more substrates is to adjust fractional derivative values.

Example 11 includes the semiconductor apparatus of Example 7, wherein the logic coupled to the one or more substrates is to select the plurality of activation functions from a library of trainable activation functions.

Example 12 includes the semiconductor apparatus of any one of Examples 7 to 11, wherein the one or more conditions include an accuracy condition.

Example 13 includes at least one computer readable storage medium comprising a set of instructions, which when executed by a computing system, cause the computing system to adjust a plurality of weights in a neural network model, adjust, via a plurality of difference values on a per neuron basis, a plurality of activation functions in the neural network model, and output the neural network model in response to one or more conditions being satisfied by the plurality of weights and the plurality of activation functions.

Example 14 includes the at least one computer readable storage medium of Example 13, wherein two or more of the plurality of activation functions are to be different from one another.

Example 15 includes the at least one computer readable storage medium of Example 13, wherein to adjust the plurality of activation functions on the per neuron basis, the instructions, when executed, cause the computing system to apply a first difference value to a first activation function of a first neuron and apply a second difference value to a second activation function of a second neuron.

Example 16 includes the at least one computer readable storage medium of Example 13, wherein to adjust the plurality of activation functions, the instructions, when executed, cause the computing system to adjust fractional derivative values.

Example 17 includes the at least one computer readable storage medium of Example 13, wherein the instructions, when executed, cause the computing system to select the plurality of activation functions from a library of trainable activation functions.

Example 18 includes the at least one computer readable storage medium of any one of Examples 13 to 17, wherein the one or more conditions include an accuracy condition.

Example 19 includes a method comprising adjusting a plurality of weights in a neural network model, adjusting, via a plurality of difference values on a per neuron basis, a plurality of activation functions in the neural network model, and outputting the neural network model in response one or more conditions being satisfied by the plurality of weights and the plurality of activation functions.

Example 20 includes the method of Example 19, wherein two or more of the plurality of activation functions are different from one another.

Example 21 includes the method of Example 19, wherein adjusting the plurality of activation functions on the per neuron basis includes applying a first difference value to a first activation function of a first neuron and applying a second difference value to a second activation function of a second neuron.

Example 22 includes the method of Example 19, wherein adjusting the plurality of activation functions includes adjusting fractional derivative values.

Example 23 includes the method of Example 19, further including selecting the plurality of activation functions from a library of trainable activation functions.

Example 24 includes the method of any one of Examples 19 to 23, wherein the one or more conditions include an accuracy condition.

Example 25 includes means for performing the method of any one of Example 19 to 24.

Technology described herein therefore provides a NN topology that can use different activation functions at each one of the neurons inside the network to achieve better performance. The activation function selection proceeds automatically through the control of an additional training hyper-parameter (e.g., fractional derivative value a) that can be incorporated into the standard backpropagation process. The feasibility and advantages of the technology have been proven experimentally via trainable fractional activation functions for multiple illustrative examples. For example, the technology is able to classify problems in fewer epochs with better accuracy than a traditional NN with fixed activation functions. Additionally, a ResNet18 NN implemented using the technology described herein outperformed a ResNet100 NN in accuracy trained with the CIFAR-10 image dataset.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and a memory coupled to the processor, the memory including a set of instructions, which when executed by the processor, cause the computing system to:
adjust a plurality of weights in a neural network model,
generate partial derivatives of a plurality of activation functions in the neural network model with respect to fractional derivative values, wherein the fractional derivative values are part of the plurality of activation functions and control whether the plurality of activation functions morph during training,
generate a plurality of difference values based on the partial derivatives,
adjust the fractional derivative values in the plurality of activation functions based on the plurality of difference values and on a per neuron basis to modify the plurality of activation functions in the neural network model to morph the plurality of activation functions, and
output the neural network model in response to one or more conditions being satisfied by the plurality of weights and the plurality of activation functions.

2. The computing system of claim 1, wherein two or more of the plurality of activation functions are to be different from one another.

3. The computing system of claim 1, wherein to modify the plurality of activation functions, the instructions, when executed, cause the computing system to:
apply a first difference value from the plurality of difference values to a first activation function of the plurality of activation functions that is associated with a first neuron; and
apply a second difference value from the plurality of difference values to a second activation function of the plurality of activation functions that is associated with a second neuron.

4. The computing system of claim 1, wherein the instructions, when executed, cause the computing system to select the plurality of activation functions from a library of trainable activation functions.

5. The computing system of claim 1, wherein the one or more conditions include an accuracy condition.

6. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
adjust a plurality of weights in a neural network model,
generate partial derivatives of a plurality of activation functions in the neural network model with respect to fractional derivative values, wherein the fractional derivative values are part of the plurality of activation functions and control whether the plurality of activation functions morph during training,
generate a plurality of difference values based on the partial derivatives,
adjust the fractional derivative values in the plurality of activation functions based on the plurality of difference values and on a per neuron basis to modify the plurality of activation functions in the neural network model to morph the plurality of activation functions, and
output the neural network model in response to one or more conditions being satisfied by the plurality of weights and the plurality of activation functions.

7. The semiconductor apparatus of claim 6, wherein two or more of the plurality of activation functions are to be different from one another.

8. The semiconductor apparatus of claim 6, wherein to modify the plurality of activation functions, the logic coupled to the one or more substrates is to:
apply a first difference value from the plurality of difference values to a first activation function of the plurality of activation functions that is associated with a first neuron; and
apply a second difference value from the plurality of difference values to a second activation function of the plurality of activation functions that is associated with a second neuron.

9. The semiconductor apparatus of claim 6, wherein the logic coupled to the one or more substrates is to select the plurality of activation functions from a library of trainable activation functions.

10. The semiconductor apparatus of claim 6, wherein the one or more conditions include an accuracy condition.

11. At least one non-transitory computer readable storage medium comprising a set of instructions, which when executed by a computing system, cause the computing system to:
adjust a plurality of weights in a neural network model;
generate partial derivatives of a plurality of activation functions in the neural network model with respect to fractional derivative values, wherein the fractional derivative values are part of the plurality of activation functions and control whether the plurality of activation functions morph during training;
generate a plurality of difference values based on the partial derivatives;
adjust the fractional derivative values in the plurality of activation functions based on the plurality of difference values and on a per neuron basis to modify the plurality of activation functions in the neural network model; and
output the neural network model in response to one or more conditions being satisfied by the plurality of weights and the plurality of activation functions.

12. The at least one non-transitory computer readable storage medium of claim 11, wherein two or more of the plurality of activation functions are to be different from one another.

13. The at least one non-transitory computer readable storage medium of claim 11, wherein to adjust the plurality of activation functions, the instructions, when executed, cause the computing system to:
apply a first difference value from the plurality of difference values to a first activation function of the plurality of activation functions that is associated with a first neuron; and
apply a second difference value from the plurality of difference values to a second activation function of the plurality of activation functions that is associated with a second neuron.

14. The at least one non-transitory computer readable storage medium of claim 11, wherein the instructions, when executed, cause the computing system to select the plurality of activation functions from a library of trainable activation functions.

15. The at least one non-transitory computer readable storage medium of claim 11, wherein the one or more conditions include an accuracy condition.

16. A method comprising:
adjusting a plurality of weights in a neural network model;
generating partial derivatives of a plurality of activation functions in the neural network model with respect to fractional derivative values, wherein the fractional derivative values are part of the plurality of activation functions and control whether the plurality of activation functions morph during training;

generating a plurality of difference values based on the partial derivatives;

adjusting the fractional derivative values in the plurality of activation functions based on the plurality of difference values and on a per neuron basis to modify the plurality of activation functions in the neural network model to morph the plurality of activation functions; and outputting the neural network model in response one or more conditions being satisfied by the plurality of weights and the plurality of activation functions.

17. The method of claim 16, wherein two or more of the plurality of activation functions are different from one another.

18. The method of claim 16, wherein modifying the plurality of activation functions includes:

applying a first difference value from the plurality of difference values to a first activation function of the plurality of activation functions that is associated with a first neuron; and applying a second difference value from the plurality of difference values to a second activation function of the plurality of activation functions that is associated with a second neuron.

19. The method of claim 16, further including selecting the plurality of activation functions from a library of trainable activation functions.

20. The method of claim 16, wherein the one or more conditions include an accuracy condition.

* * * * *